United States Patent [19]

DiChiara

[11] Patent Number: 5,601,259

[45] Date of Patent: Feb. 11, 1997

[54] TWO-WAY SAFETY TRIP FOR RAILWAY VEHICLES

[75] Inventor: Anthony J. DiChiara, Garden City, N.Y.

[73] Assignee: Boda Industries, Inc., South Hackensack, N.J.

[21] Appl. No.: 622,071

[22] Filed: Mar. 26, 1996

[51] Int. Cl.⁶ ..................................................... B61L 3/04
[52] U.S. Cl. ................................. 246/203 C; 246/182 B; 246/203 R; 246/207; 188/111
[58] Field of Search ..................... 246/182 B, 201, 246/203 R, 203 C, 203 D, 203 E, 207; 188/62, 63, 111; 104/249, 252

[56] References Cited

U.S. PATENT DOCUMENTS

| | | | |
|---|---|---|---|
| 832,385 | 10/1906 | Hollingsworth | 188/63 |
| 977,967 | 12/1910 | Reynolds | 246/203 D |
| 995,316 | 6/1911 | Bauert | 246/203 C |
| 1,019,281 | 3/1912 | Stasch | 188/63 |
| 1,109,693 | 9/1914 | Morris | 188/63 |
| 1,129,200 | 2/1915 | Jones | 246/203 R |
| 1,168,499 | 1/1916 | Hill | 246/203 E |
| 1,378,568 | 5/1921 | Simpson et al. | 104/252 |
| 1,408,089 | 2/1922 | Johnson | 104/252 |
| 1,634,756 | 7/1927 | Schliederer | 188/111 |
| 1,701,040 | 2/1929 | Jennings | 188/63 |
| 1,746,163 | 2/1930 | Perkins | 188/127 |
| 1,796,557 | 3/1931 | Bristol | 104/252 |
| 1,806,214 | 5/1931 | Perry | 188/111 |
| 2,088,857 | 8/1937 | Holmes | 246/170 |
| 2,660,959 | 12/1953 | Stickler, Jr. | 104/252 |
| 4,433,628 | 2/1984 | Wakabayashi | 104/172.4 |

*Primary Examiner*—S. Joseph Morano
*Attorney, Agent, or Firm*—Arthur Jacob

[57] ABSTRACT

A two-way safety trip is placed at selected locations along a railway track to demarcate a safety zone within which the travel of a railway vehicle is stopped upon entering the zone and is permitted to continue upon leaving the zone, the safety trip including a bracket for attachment to the track and a trip member selectively mounted upon the bracket in alternate mounting orientations for serving at either boundary of the safety zone.

15 Claims, 3 Drawing Sheets

TWO-WAY SAFETY TRIP FOR RAILWAY VEHICLES

The present invention relates generally to safety devices for railroads and pertains, more specifically, to a two-way safety trip for placement adjacent a railway track to activate the braking mechanism of a railway vehicle should the railway vehicle inadvertently be routed into a designated zone so as to halt the railway vehicle as it enters that zone, and to not activate the braking mechanism upon leaving the zone so that the railway vehicle is permitted to travel out of the zone.

Railway vehicles, such as railroad locomotives and railroad cars, generally are provided with a safety trip cock arm which depends from the railway vehicle to be intercepted by various safety devices for activating the braking mechanism of the vehicle to stop the vehicle in response to actuation of the safety trip cock arm. For example, should a work crew be engaged in maintenance work within a certain zone of track, a safety trip will be placed adjacent the track, usually at each end of the zone, to intercept and trip the safety trip cock arm of any railway vehicle inadvertently routed into the zone, thereby activating the braking mechanism of the vehicle to stop the vehicle and prevent injury to the crew.

The present invention provides a two-way safety trip which may be placed adjacent the track for stopping a railway vehicle traveling in one direction along the track, while permitting travel to continue in an opposite direction so that the vehicle is safely stopped upon inadvertently entering a designated zone and is permitted to travel to leave the zone. The two-way safety trip is selectively adapted to stop the vehicle as the vehicle travels in a selected one of two opposite directions along the track, while permitting travel in the other of the two opposite directions, so that a single, relatively simple device serves in both capacities at any desired location along the track, for either direction of travel of the railway vehicle. As such, the present invention attains several objects and advantages, some of which are summarized as follows: Provides a safety trip which is selectively adaptable for placement at desired locations along a railway track to serve to stop a railway vehicle entering a designated zone along the track, and to permit the vehicle to leave the designated zone; enables ease of use in the field for effective performance with minimal skill and without the necessity for special tools in accomplishing installation or in adapting the safety trip for appropriate operation at any desired location; encourages safety in the field by providing exemplary performance with minimal effort on the part of workers in the field; enables ready replacement of any damaged component parts, in the field, with increased ease and efficiency; provides a simplified construction utilizing a minimum number of component parts economically manufactured of durable materials for reducing expense and attaining dependable performance over a relatively long service life.

The above objects and advantages, as well as further objects and advantages, are attained by the present invention which may be described briefly as a two-way safety trip for placement adjacent a railway track along which a railway vehicle travels in either one of opposite first and second directions of travel, the railway vehicle having a braking mechanism including an actuator for traveling along a given path of travel as the railway vehicle travels along the track such that the safety trip will engage the actuator to activate the braking mechanism when the railway vehicle is traveling in a selected one of the first and second directions of travel to stop the travel of the railway vehicle in the one of the first and second directions of travel, and will engage the actuator to not activate the braking mechanism when the railway vehicle is traveling in the other of the first and second directions of travel so as to permit continued travel of the railway vehicle in the other of the first and second directions of travel, the safety trip comprising: a bracket; attachment means for attachment of the bracket adjacent the track, at a basal location wherein at least a portion of the bracket is placed adjacent the path of travel of the actuator of the braking mechanism; a trip member; mounting means mounting the trip member upon the bracket for pivotal movement about a pivotal axis located adjacent the path of travel of the actuator of the braking mechanism when the bracket is attached at the basal location, the pivotal movement being between a first position and a second position; stop means on the bracket, the stop means being spaced from the pivotal axis about which the trip member is mounted; a trip arm on the trip member for extending from the pivotal axis into the path of travel of the actuator when the trip member is in the first position, and for extending out of the path of travel of the actuator when the trip member is in the second position; a stop arm on the trip member for extending toward the stop means to engage the stop means when the trip member is in the first position, and for extending away from the stop means when the trip member is in the second position; and biasing means biasing the trip member into the first position; the stop means including a first stop facing in a direction opposite to the first direction of travel of the railway vehicle and a second stop facing in a direction opposite to the second direction of travel of the railway vehicle, when the bracket is attached at the basal location; the mounting means including selective means for selectively mounting the trip member upon the bracket in either one of a first mounting orientation and a second mounting orientation; the first mounting orientation being such that the stop arm confronts the first stop when the trip member is in the first position, with the trip arm extending into the path of travel of the actuator, for permitting pivotal movement of the trip member from the first position toward the second position in a first pivotal direction in response to engagement of the actuator with the trip arm as the actuator moves along the path of travel during travel of the railway vehicle in the first direction of travel so as to enable continued travel of the railway vehicle in the first direction of travel, and for precluding pivotal movement of the trip member from the first position toward the second position in a second pivotal direction in response to engagement of the actuator with the trip arm as the actuator moves along the path of travel during travel of the railway vehicle in the second direction of travel so as to trip the actuator and activate the brake mechanism to bring the railway vehicle to a stop; and the second mounting orientation being such that the stop arm confronts the second stop when the trip member is in the first position, with the trip arm extending into the path of travel of the actuator, for permitting pivotal movement of the trip member from the first position toward the second position in the second pivotal direction in response to engagement of the actuator with the trip arm as the actuator moves along the path of travel during travel of the railway vehicle in the second direction of travel so as to enable continued travel of the railway vehicle in the second direction of travel, and for precluding pivotal movement of the trip member from the first position toward the second position in the first pivotal direction in response to engagement of the actuator with the trip arm as the actuator moves along the path of travel during travel of the railway vehicle in the first direction of travel so as to trip the actuator and activate the brake mechanism to bring the railway vehicle to a stop; whereby the safety trip will stop the travel of the railway vehicle in the selected one of the first and second directions of travel and will permit continued travel of the railway vehicle in the other of the first and second directions of travel.

The invention will be understood more fully, while still further objects and advantages will become apparent, in the following detailed description of a preferred embodiment of the invention illustrated in the accompanying drawing, in which.

Figure 1:
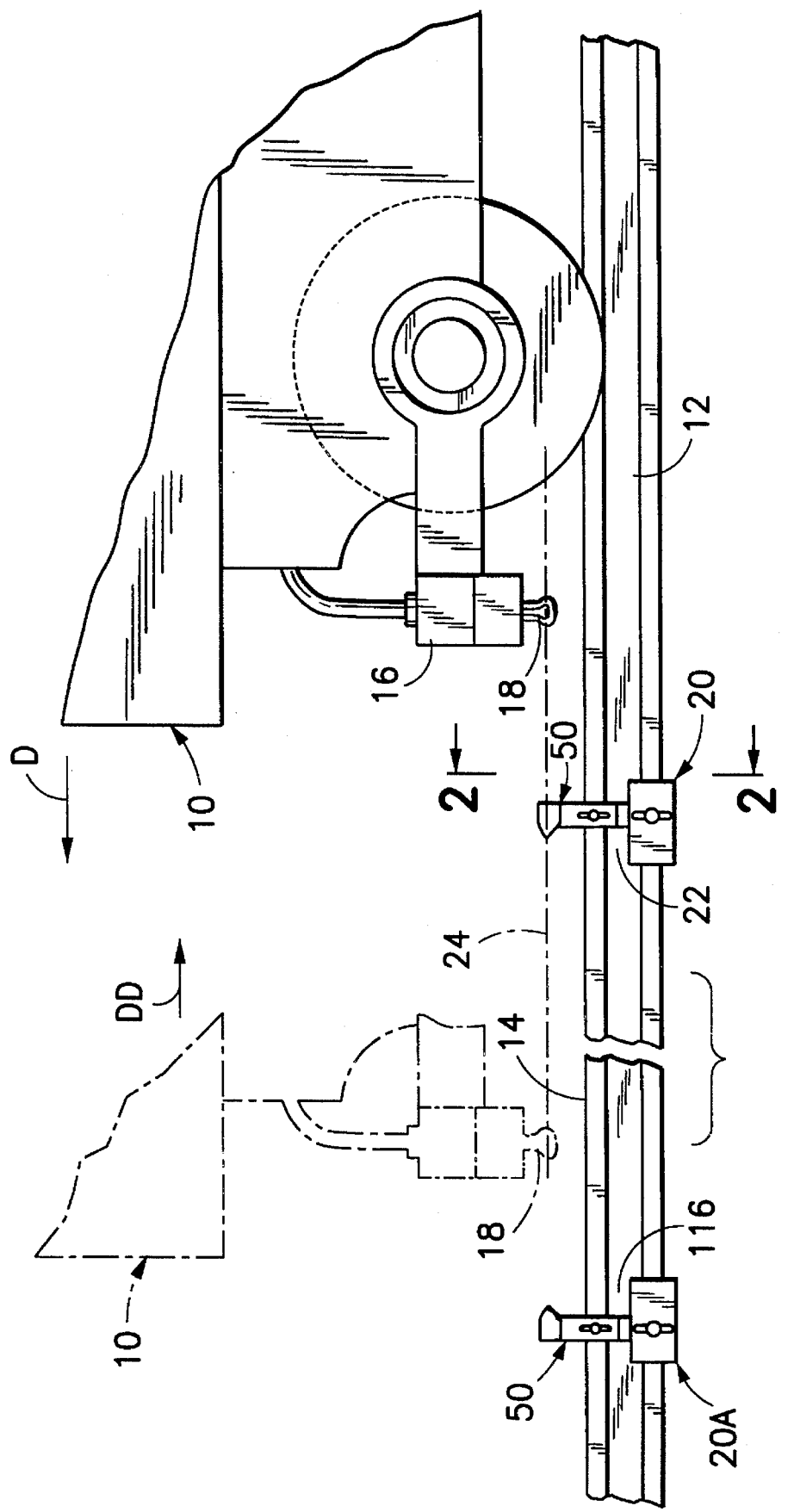
FIG. 1 is a largely diagrammatic fragmentary view depicting a railway vehicle traveling along a track having a designated zone demarcated by two-way safety trips constructed in accordance with the present invention.

Referring now to the drawing, and especially to FIG. 1 thereof, a railway vehicle 10 is traveling along a railway track 12 in a first direction D and is approaching a designated zone which may be, for example, a work zone 14 in which workers are attending to maintenance of the track 12 and into which railway vehicle 10 has been routed inadvertently. Railway vehicle 10 has a braking mechanism, shown diagrammatically at 16, which includes a safety trip cock arm in the form of an actuator 18 depending from the railway vehicle 10. Actuator 18 is located on the railway vehicle 10 and is connected with the braking mechanism 16 such that upon tripping the actuator 18 the braking mechanism 16 will be activated to stop the vehicle 10, in a now conventional manner.

In order to protect workers in the work zone 14 against injury from the railway vehicle 10 moving into the work zone 14, a safety trip is provided to trip the actuator 18 and activate the braking mechanism 16 to stop the railway vehicle 10 as the vehicle 10 enters the work zone 14. Accordingly, a two-way safety trip 20 constructed in accordance with the invention is placed at a first location 22 along the track 12 in position to intercept the actuator 18 moving along a path of travel 24 as the railway vehicle travels along the track 12 in the direction D, location 22 marking an up-track boundary of the work zone 14.

Figure 2:
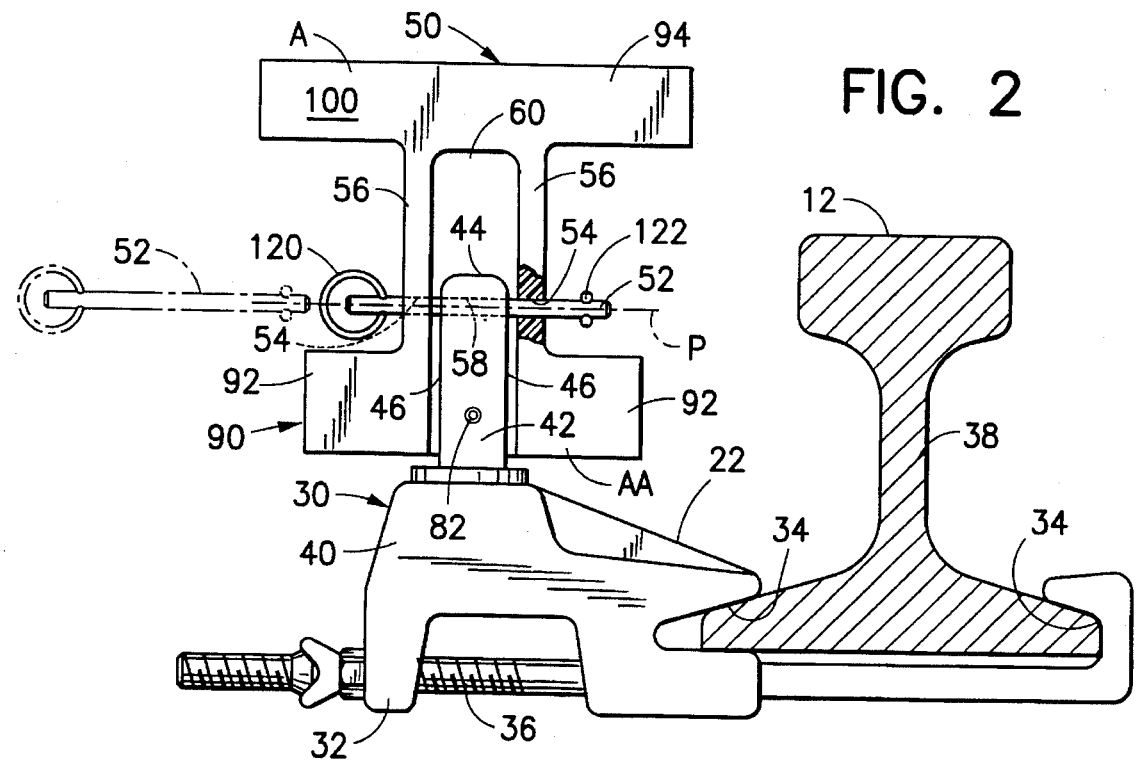
FIG. 2 is an enlarged end elevational view, sectioned along line 2—2 of FIG. 1, showing one of the two-way safety trips of FIG. 1.

Turning now to FIG. 2, safety trip 20 includes a bracket 30 which may be attached at any selected location along the track 12 by attachment means shown in the form of a clamp 32 having opposed jaws 34 actuated by a clamping screw 36 to secure a rail 38 of the track 12 between the jaws 34, thereby affixing the bracket 30 to the track 12 at the location 22. Bracket 30 has a base 40 integral with the clamp 32 and placed at a basal location adjacent to and at an elevation below the path of travel 24 of the actuator 18. A post 42 is integral with the base 40 and projects altitudinally upwardly from the base 40 to a terminal end 44. Post 42 has a generally rectangular horizontal cross-sectional configuration and includes essentially flat sides 46, a front surface 48 (see FIG. 3) and a longitudinally opposite rear surface 49.

A trip member 50 is mounted upon the post 42 of the bracket 30 by mounting means in the form of a pivot pin 52 which passes through laterally aligned bores 54 in a pair of side flanges 56 on the trip member 50 and a further bore 58 in the post 42, the post 42 being received within a recess 60 formed between the side flanges 56 of the trip member 50. In this manner, the trip member 50 is journaled for pivotal movement about a pivotal axis P, established by the pivot pin 52, the axis P extending laterally transversely across the track 12, at an elevation below the path of travel 24 of the actuator 18.

Figure 3:
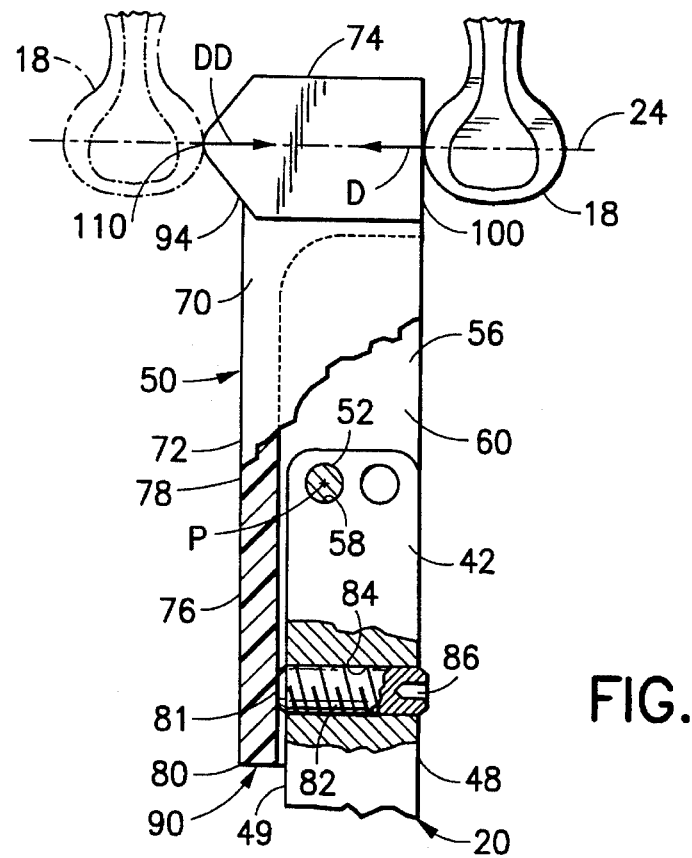
FIG. 3 is a further enlarged, partially sectioned, fragmentary side elevational view of the two-way safety trip of FIG. 2.

As best seen in FIG. 3, as well as in FIGS. 1 and 2, trip member 50 has a trip arm 70 extending from the pivotal axis P altitudinally upwardly into the path of travel 24 of the actuator 18, trip arm 70 having a first, or near end 72 adjacent the bores 54 and a second, or far end 74 spaced altitudinally from the near end 72. A stop arm 76 on the trip member 50 extends downwardly from the pivotal axis P, in a direction diametrically opposite the direction of extent of trip arm 70, the stop arm 76 having a first, or near end 78 adjacent the bores 54 and a second, or far end 80 spaced from the near end 78 to place the far end 80 in confrontation with stop means on the bracket 30, the stop means being shown in the form of a stop 81 located on a stop member 82 threaded though the post 42 at a threaded hole 84. A socket 86 in the stop member 82 enables selective adjustment of the longitudinal position of the stop provided by the stop member 82. The trip member 50 is biased in a pivotal direction into the position shown in FIGS. 2 and 3 by biasing means illustrated in the form of a weighted portion 90 on the trip member 50, the weighted portion 90 including weight members 92 (see FIG. 2) extending laterally from the side flanges 56 of the trip member 50 at the far end 80 of the stop arm 76 and biasing the far end of the stop arm 76 against the stop member 82 to place and maintain a follower 94 at the far end 74 of the trip arm 70 in the path of travel 24 of the actuator 18.

As the railway vehicle 10 travels in the direction D into the work zone 14, the actuator 18, moving along the path of travel 24, is intercepted by the trip arm 70, as seen in full lines in FIG. 3. The actuator 18 strikes a face 100 of the follower 94, the face 100 facing in a direction opposite to direction D to confront the actuator 18 and, since the trip arm 70 remains stationary by virtue of the stop arm 76 engaging the stop member 81, the actuator 18 is displaced to activate the braking mechanism 16 of the railway vehicle 10 and the railway vehicle 10 is brought to a stop, thereby assuring the safety of the workers in the work zone 14.

Figure 4:
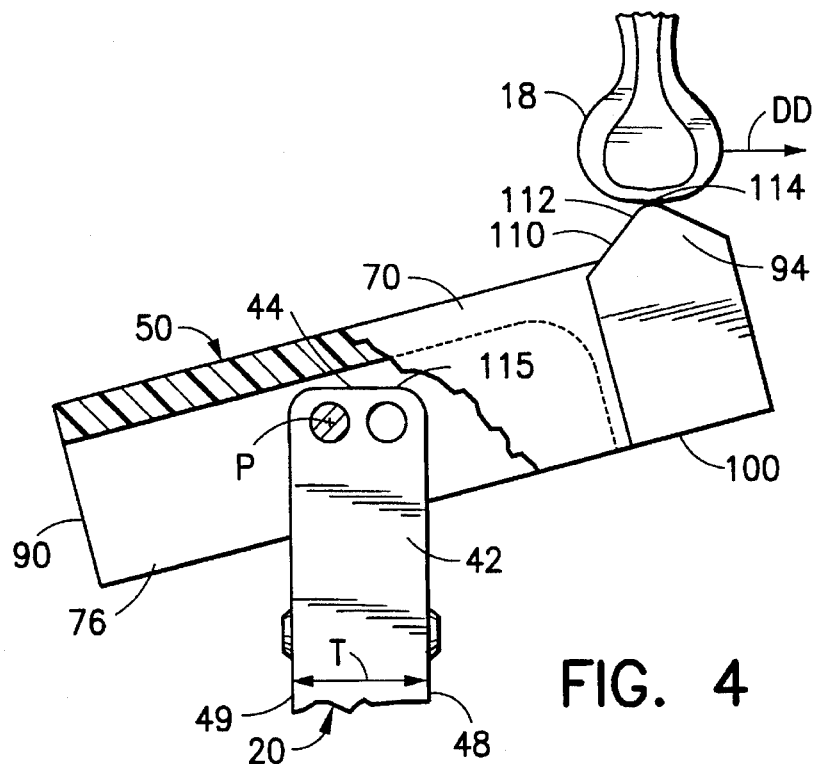
FIG. 4 is a fragmentary side elevational view similar to FIG. 3, but with component parts in another operating position.

When the railway vehicle 10 travels in a direction DD, opposite to the direction D, to leave the work zone 14, as illustrated in phantom in FIGS. 1 and 3, the actuator 18 once again is intercepted by the trip arm 70; however, during travel in the direction DD, the actuator 18 strikes the follower 94 at a face 110 facing in the direction opposite to direction DD, as shown phantom in FIG. 3, and the follower 94 moves in response to engagement with actuator 18 to pivot the trip arm 70 about the pivotal axis P, in a pivotal direction against the bias of the weighted portion 90, to the position illustrated in FIG. 4, enabling the actuator 18 to pass the safety trip 20 without a displacement of the actuator 18 which would activate the braking mechanism 16. It is noted that the balance provided by the weighted portion 90 enables the trip member 50 to be pivoted to the position shown in FIG. 4 without a resistance which otherwise could trip the actuator 18. Thus, the railway vehicle 10 continues travel in the direction DD and is permitted to leave the work zone 14. A camming surface 112 on the face 110 facilitates the passage of the actuator 18 over the follower 94 without a displacement which could activate the braking mechanism, the camming surface 112 being in the form of a tapered surface tapering toward a tip 114 of the follower 94. The extended flattened top surface at the terminal end 44 of the post 42 provides limit means in the form of a limit stop 115 located relative to pivotal axis P to limit pivotal movement of the trip member 50, by virtue of abutment of the trip member 50 with the top surface 44 at limit stop 115, assuring that the trip member 50 will return to the position shown in FIGS. 2 and 3, after the actuator 18 passes over the follower 94, as seen in FIG. 4.

Figure 5:
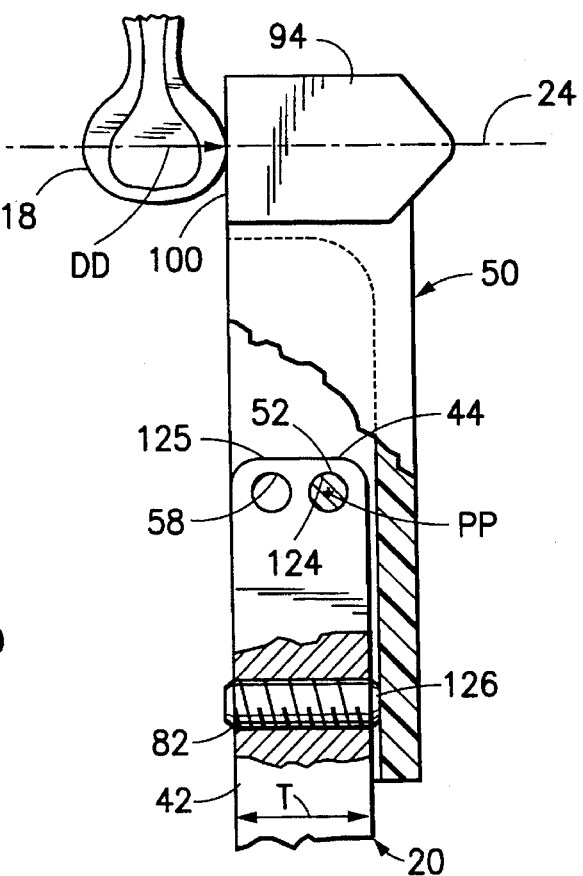
FIG. 5 is a fragmentary side elevational view similar to FIG. 3, but with component parts in an alternate arrangement.

Referring now to FIG. 1, work zone 14 is demarcated by two safety trips, the first safety trip 20 having been described in detail above and placed at first location 22, and a second safety trip 20A placed adjacent the track 12 in the very same manner as the first safety trip 20, at a second location 116 spaced a longitudinal distance down the track 12 from the first location 22, and safety trip 20. Safety trip 20A is, in fact, identical in construction to safety trip 20; however, the configuration of the assembled component parts has been changed to adapt the safety trip 20A to serve in the down-track location 116, as opposed to the up-track location 22 of safety trip 20. To this end, the pivot pin 52 includes a pull-ring 120 adjacent one end of the pivot pin 52, as seen in FIG. 2, and a detent 122 at the other end of the pivot pin 52. Pivot pin 52 is retained in place, as shown in full lines in FIG. 2, by the detent 122 and the pull-ring 120, and is selectively disengaged from the trip arm 70 and the post 42 merely by pulling the pivot pin 52 from the aligned bores 54 and 58, as illustrated in phantom in FIG. 2, to release the trip member 50 from the bracket 30. The trip member 50 then is reversed longitudinally, from face to face, so that the face 100 of follower 94 faces down the track 12 and the face 110 of follower 94 faces up the track 12, as shown in FIGS. 1 and 5, opposite to the orientation of the trip member 50 of safety trip 20 in the up-track location 22. The pivot pin 52 then is re-inserted to mount the trip member 50 upon the bracket 30 in a mounting orientation opposite to the mounting orientation illustrated in FIGS. 2 through 4.

However, as seen in FIG. 5, the pivot pin 52 now is passed through the bores 54 in the trip member 50 and through an alternate bore 124 in the post 42. The provision of alternate bores 58 and 124 spaced apart longitudinally in the post 42 for the corresponding alternate mounting orientations and alternate configurations of the safety trips 20 and 20A enables the post 42 to be constructed with a longitudinal thickness T, between front surface 48 and rear surface 49, great enough to provide sufficient strength to resist the impact of the actuator 18 upon the trip member 50 during operation of the safety trip 20 in causing activation of the braking mechanism 16 of the railway vehicle 10, while enabling a simple operation to adapt the safety trip 20 for service at either an up-track boundary or a down-track boundary of a designated zone, as illustrated by locations 22 and 116 demarcating work zone 14. At the same time, thickness T provides the top surface of the terminal end 44 of post 42 with further limit means in the form of a limit stop 125 located relative to alternate pivotal axis PP established by insertion of the pivot pin 52 through alternate bore 124 to limit pivotal movement of the trip member 50, in the manner described above in connection with limit stop 115 and pivotal axis P. The stop member 81, by virtue of passing longitudinally through the post 42, serves as a stop at 126 and is adjustable longitudinally to place the stop 126 in appropriate position. Accordingly, in the down-track location 116, safety trip 20A serves to stop a railway vehicle traveling into the work zone 14 in direction DD, opposite to direction D, and permits travel of the railway vehicle 10 in the direction D, to leave the work zone 14.

Preferably, the opposite faces 100 and 110 of the follower 94 are color coded to assist in identifying the correct selected orientation of the trip member 50 as the trip member 50 is mounted upon the bracket 30. Thus, face 100 may display the color red to indicate that the railway vehicle 10 will be stopped when confronted with face 100, while the face 110 may display the color green to indicate that the railway vehicle 10 can proceed when confronted with face 110. The trip member 50 has a generally I-shaped shaped front elevational configuration, as viewed in FIG. 2, with the follower 94 projecting in directions laterally away from both sides 46 of the post 42 so as to extend into the path of travel 24 of the actuator 18 in either of the alternate mounting orientations of the trip member 50. In addition, the weight members 92 project in directions laterally away from both sides 46 of the post 42 to provide adequate weight and balance for biasing the trip member 50 into the position shown in FIGS. 2, 3 and 5 and facilitating the operations described above. The projecting weight members 92 in the I-shaped configuration also tend to counterbalance any effects of wind which otherwise could affect the balance of the pivoted trip member 50 so as to maintain the trip member 50 in the position shown in FIGS. 2, 3 and 5. Thus, the I-shaped configuration enables the total frontal area A of the trip member 50 presented above the pivotal axis P to equal essentially the total frontal area AA presented below the pivotal axis P, thereby balancing the forces of any wind on the trip member 50 and assuring that winds will not deflect the trip arm 50 out of the position illustrated in FIGS. 2, 3 and 5 while still maintaining the ease of deflection necessary to permit passage of the actuator 18 as the railway vehicle 10 exits the work zone 14. Hence, the simplified construction of safety trip 20 enables two-way operation without requiring added components and without the necessity for special tools and special skills in order to place the safety trip 20 into service in the field.

The simplified configuration of the bracket 30 and the trip member 50 enable economical manufacture of the component parts of relatively inexpensive, yet durable materials. Thus, the bracket 30 may be constructed of malleable cast iron, with the post 42 cast unitary with the base 40. The trip member 50 is economically constructed of a synthetic polymeric material, such as polyethylene.

It will be seen that the present invention attains the several objects and advantages summarized above, namely: Provides a safety trip which is selectively adaptable for placement at desired locations along a railway track to serve to stop a railway vehicle entering a designated zone along the track, and to permit the vehicle to leave the designated zone; enables ease of use in the field for effective performance with minimal skill and without the necessity for special tools in accomplishing installation or in adapting the safety trip for appropriate operation at any desired location; encourages safety in the field by providing exemplary performance with minimal effort on the part of workers in the field; enables ready replacement of any damaged component parts, in the field, with increased ease and efficiency; provides a simplified construction utilizing a minimum number of component parts economically manufactured of durable materials for reducing expense and attaining dependable performance over a relatively long service life.

It is to be understood that the above detailed description of a preferred embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A two-way safety trip for placement adjacent a railway track along which a railway vehicle travels in either one of opposite first and second directions of travel, the railway vehicle having a braking mechanism including an actuator for traveling along a given path of travel as the railway vehicle travels along the track such that the safety trip will engage the actuator to activate the braking mechanism when the railway vehicle is traveling in a selected one of the first and second directions of travel to stop the travel of the railway vehicle in the one of the first and second directions of travel, and will engage the actuator to not activate the braking mechanism when the railway vehicle is traveling in the other of the first and second directions of travel so as to permit continued travel of the railway vehicle in the other of the first and second directions of travel, the safety trip comprising:

a bracket;

attachment means for attachment of the bracket adjacent the track, at a basal location wherein at least a portion of the bracket is placed adjacent the path of travel of the actuator of the braking mechanism;

a trip member;

mounting means mounting the trip member upon the bracket for pivotal movement about a pivotal axis located adjacent the path of travel of the actuator of the braking mechanism when the bracket is attached at the basal location, the pivotal movement being between a first position and a second position;

stop means on the bracket, the stop means being spaced from the pivotal axis about which the trip member is mounted;

a trip arm on the trip member for extending from the pivotal axis into the path of travel of the actuator when the trip member is in the first position, and for extending out of the path of travel of the actuator when the trip member is in the second position;

a stop arm on the trip member for extending toward the stop means to engage the stop means when the trip member is in the first position, and for extending away from the stop means when the trip member is in the second position; and biasing means biasing the trip member into the first position;

the stop means including a first stop facing in a direction opposite to the first direction of travel of the railway vehicle and a second stop facing in a direction opposite to the second direction of travel of the railway vehicle, when the bracket is attached at the basal location;

the mounting means including selective means for selectively mounting the trip member upon the bracket in either one of a first mounting orientation and a second mounting orientation;

the first mounting orientation being such that the stop arm confronts the first stop when the trip member is in the first position, with the trip arm extending into the path of travel of the actuator, for permitting pivotal movement of the trip member from the first position toward the second position in a first pivotal direction in response to engagement of the actuator with the trip arm as the actuator moves along the path of travel during travel of the railway vehicle in the first direction of travel so as to enable continued travel of the railway vehicle in the first direction of travel, and for precluding pivotal movement of the trip member from the first position toward the second position in a second pivotal direction in response to engagement of the actuator with the trip arm as the actuator moves along the path of travel during travel of the railway vehicle in the second direction of travel so as to trip the actuator and activate the brake mechanism to bring the railway vehicle to a stop; and the second mounting orientation being such that the stop arm confronts the second stop when the trip member is in the first position, with the trip arm extending into the path of travel of the actuator, for permitting pivotal movement of the trip member from the first position toward the second position in the second pivotal direction in response to engagement of the actuator with the trip arm as the actuator moves along the path of travel during travel of the railway vehicle in the second direction of travel so as to enable continued travel of the railway vehicle in the second direction of travel, and for precluding pivotal movement of the trip member from the first position toward the second position in the first pivotal direction in response to engagement of the actuator with the trip arm as the actuator moves along the path of travel during travel of the railway vehicle in the first direction of travel so as to trip the actuator and activate the brake mechanism to bring the railway vehicle to a stop;

whereby the safety trip will stop the travel of the railway vehicle in the selected one of the first and second directions of travel and will permit continued travel of the railway vehicle in the other of the first and second directions of travel.

2. The invention of claim 1 wherein;

the pivotal axis is located below the path of travel of the actuator of the braking mechanism when the bracket is attached at the basal location;

the stop means is located at an elevation below the pivotal axis;

the trip arm extends upwardly from the pivotal axis into the path of travel of the actuator when the trip member is in the first position; and the stop arm extends downwardly to engage the stop means when the trip member is in the first position.

3. The invention of claim 2 wherein the biasing means includes a weighted portion on the trip member, the weighted portion being located below the pivotal axis when the trip member is in the first position.

4. The invention of claim 3 wherein the trip member has a generally I-shaped configuration, as viewed parallel to the first and second directions, the I-shaped configuration providing a first frontal area above the pivotal axis and a second frontal area below the pivotal axis, with the first and second frontal areas being essentially equal to balance any forces exerted upon the trip member by winds directed parallel to the first and second directions.

5. The invention of claim 3 wherein the stop arm extends from a near end adjacent the pivotal axis to a far end spaced from the near end, and the weighted portion is adjacent the far end.

6. The invention of claim 5 wherein the trip arm and the stop arm extend in diametrically opposite directions from the pivotal axis.

7. The invention of claim 6 wherein the trip member has a generally I-shaped configuration, as viewed parallel to the first and second directions, the I-shaped configuration providing a first frontal area above the pivotal axis and a second frontal area below the pivotal axis, with the first and second frontal areas being essentially equal to balance any forces exerted upon the trip member by winds directed parallel to the first and second directions.

8. The invention of claim 2 wherein the mounting means includes a pivot pin extending along the pivotal axis and journaling the trip member on the bracket, and the trip arm extends between a near end adjacent the pivot pin and a far end spaced altitudinally away from the near end and includes a follower adjacent the far end.

9. The invention of claim 8 wherein the follower has a first face facing in the direction opposite to the first direction of travel of the railway vehicle, and a second face facing in the direction opposite to the second direction of travel of the railway vehicle.

10. The invention of claim 9 wherein the follower includes a camming surface on the first face of the follower for facilitating pivotal movement of the trip member from the first position toward the second position.

11. The invention of claim 2 wherein the first and second directions of travel extend longitudinally along the track and the pivotal axis extends laterally transverse to the first and second directions of travel.

12. The invention of claim 11 wherein the selective means of the mounting means includes a pivot pin for selectively coupling and uncoupling the trip member and the bracket to enable mounting of the trip member on the bracket in either one of the first mounting orientation and the second mounting orientation.

13. The invention of claim 12 wherein the bracket includes a post projecting altitudinally upwardly and the pivot pin couples the trip member to the post, the post having a longitudinal thickness for resisting longitudinally-directed forces transmitted to the post by engagement of the actuator with the trip member, and the mounting means includes a first bore in the post for receiving the pivot pin when the trip member is mounted in the first mounting orientation and a second bore for receiving the pivot pin when the trip member is mounted in the second mounting orientation, the first and second bores being spaced longitudinally from one another.

14. The invention of claim 12 wherein the bracket includes a post projecting altitudinally upwardly, the post having an uppermost terminal end, the pivot pin couples the trip member to the post adjacent the terminal end, the mounting means includes a first bore in the post for receiving the pivot pin when the trip member is mounted in the first mounting orientation and a second bore for receiving the pivot pin when the trip member is mounted in the second mounting orientation, the first and second bores being spaced longitudinally from one another, and limit stop means adjacent the terminal end of the post for limiting pivotal movement of the trip member in the pivotal direction from the first position toward the second position so as to assure return of the trip member to the first position in response to the biasing means.

15. The invention of claim 12 wherein:

the bracket includes a post projecting altitudinally upwardly;

the trip member includes side flanges and a recess between the side flanges for receiving the post within the trip member, between the side flanges; and the pivot pin extends laterally within the side flanges and the post to couple the trip member to the post.

* * * * *